(12) United States Patent
Chau et al.

(10) Patent No.: US 9,802,865 B1
(45) Date of Patent: Oct. 31, 2017

(54) NANO-MODIFIED ALKALI-ACTIVATED CEMENTITIOUS MATERIALS FOR RAPID REPAIR

(71) Applicant: Nano and Advanced Materials Institute Limited, Hong Kong (HK)

(72) Inventors: Chung Kong Chau, Hong Kong (HK); Xiwen Guan, Hong Kong (HK); Binyu Zhang, Hong Kong (HK); Man Lung Sham, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 0 days.

(21) Appl. No.: 15/264,563

(22) Filed: Sep. 13, 2016

(51) Int. Cl.
*C04B 28/08* (2006.01)
*C04B 22/06* (2006.01)
*C04B 111/72* (2006.01)

(52) U.S. Cl.
CPC ............ *C04B 28/08* (2013.01); *C04B 22/06* (2013.01); *C04B 22/062* (2013.01); *C04B 2111/72* (2013.01)

(58) Field of Classification Search
CPC ....... C04B 28/08; C04B 22/062; C04B 22/06; C04B 2111/72
See application file for complete search history.

(56) References Cited

U.S. PATENT DOCUMENTS

| | | | |
|---|---|---|---|
| 6,780,236 B2 * | 8/2004 | Barbour | ............... C04B 22/124 106/705 |
| 7,666,327 B1 | 2/2010 | Veedu | |
| 7,691,198 B2 | 4/2010 | Van Deventer et al. | |
| 8,186,106 B2 * | 5/2012 | Schumacher | ........... C04B 28/18 106/705 |
| 2011/0112272 A1 | 5/2011 | Seal et al. | |
| 2012/0152153 A1 * | 6/2012 | Gong | ................... C04B 28/006 106/705 |
| 2014/0047999 A1 | 2/2014 | Razl | |
| 2016/0152521 A1 | 6/2016 | Gong et al. | |

FOREIGN PATENT DOCUMENTS

| | | |
|---|---|---|
| CN | 101234862 B | 6/2010 |
| CN | 102718446 A | 10/2012 |
| CN | 102807345 A | 12/2012 |
| CN | 103466988 A | 12/2013 |
| CN | 104310909 A | 1/2015 |
| CN | 104628354 A | 5/2015 |
| CN | 104291749 B | 4/2016 |
| CN | 105541198 A | 5/2016 |

* cited by examiner

*Primary Examiner* — Anthony J Green

(57) ABSTRACT

A nano-modified dry-mixed alkali-activated cementitious, or one-part geopolymer cement (OPgC), material with high early strength is provided for rapid repair of cement-based infrastructure components. The OPgC may include an aluminosilicate rich material, an alkali material and a nano-modifier, and optionally include other functional admixtures and fibers. The OPgC can be freshly mixed with water to obtain a repairing material. The OPgC may mix with water and fine or coarse aggregate to form mortar or concrete. The OPgC can be an alternative binding matrix for the development of an environmentally friendly and cost effective rapid repair material.

17 Claims, 1 Drawing Sheet

NANO-MODIFIED ALKALI-ACTIVATED CEMENTITIOUS MATERIALS FOR RAPID REPAIR

CROSS-REFERENCE TO RELATED APPLICATION

This application claims the benefit of U.S. provisional patent application No. 62/283,859 filed on Sep. 14, 2015; the contents of which are hereby incorporated by reference.

FIELD OF THE PATENT APPLICATION

The present application relates to alkali-activated cement, or geopolymer, based materials. More particularly, the present application provides nano-modified dry-mixed alkali-activated cementitious materials with high early strength for rapid repair of cement-based infrastructure components.

BACKGROUND

Cement-based infrastructure components maintenance works can be broadly classified into emergency/ad-hoc repairs and scheduled maintenance. The repairing work includes concrete infrastructures such as repair of pavement, sewerages, buildings and bridges, etc. In a background of high traffic demand, acute land constraints and growing community expectation in modern cities, all carriageway repair works are to be carried out under extremely tight working schedule and within limited hours up to at most a few days. Moreover, modern cities have complex sewage system with numerous sewer pipes constructed in the spaces running between infrastructures. Therefore, rapid hardening construction materials with specific performance requirement are urged for repair and maintenance of cement-based infrastructure components such as concrete carriageways and sewage system.

According to the nature of the major binding material adopted in different repair materials, they can be generally categorized into two systems, namely organic binder based system and inorganic binder based system.

One of the representatives of rapid repair material using organic binders is polymer concrete made by fully replacing hydraulic cement with polymeric binders or liquid resins such as thermosetting resins, vinyl monomers, and tar modified resins. They do not contain any cement hydrate phases in the binding system. Most of the thermosetting resin and monomer systems for polymer concrete are polymerized at ambient temperature. Fresh polymer concrete are placed and finished in a manner similar to conventional cement concrete. However, due to the short setting time, skillful labors are required to place, compact and texture the concrete. Besides, the stink odor and volatile organic compounds (VOCs) emission from the polymeric components during mixing and placing cause a great concern on health and environmental protection issues.

Ordinary Portland cement (OPC) is the most common inorganic binder based system used as rapid repair material. Utilizing different chemical admixtures or superplasticizers, ordinary Portland cement based rapid repair material can be set and develop early strength within a short period of time, e.g. less than 24 h. While it is suitable for rapid repair works, it should be noted that the early strength development of this type of material is temperature dependent and the physical strength development rate may decrease significantly as the surrounding temperature falls.

Alkali-activated cement (AAC), or geopolymer, is an environmentally friendly and quick-setting inorganic binding material with high early strength, excellent fire and acid resistance. It gains strength and other mechanical properties via chemical reaction between a source of alkali (soluble base activator) and calcium and/or aluminate rich materials. The alkali used as the activator is usually in solution form, and may include sodium/potassium silicate solution, sodium/potassium hydroxide solution, their combinations, or other sources of alkali. The formation of cementitious material involves a heterogeneous chemical reaction under alkaline conditions on silicon-aluminum minerals that gives a low-temperature sodium aluminosilicate glass, which is a special class of hydrated aluminosilicates chemically similar to naturally occurring zeolites. Having lower embodied energy and carbon footprints than ordinary Portland cement, alkali-activated cement is a prominent alternative cementing material for sustainable development.

However, one disadvantage of using liquid alkali as activators in the preparation of alkali-activated cement is the potential occupational and safety hazard problem since severe injuries such as chemical burns may occur during the concrete manufacturing process. Other disadvantages include the inconvenience of material storage, increased cost of transportation, possible leakage of alkali solution, etc. Therefore, there is a need to develop a dry-mix AAC with all constituents in powder form, one-part geopolymer cement (OPgC), which can be used on site by adding water only to gain strength and possesses superior durability over ordinary Portland cement.

The AAC formulated in dry-mix powder form can be further strengthened by nano modification utilizing nano-sized building blocks. Viewed from the bottom-up, alkali-activated cement based rapid repair material at the nanoscale is a composite of molecular assemblages, surfaces (binding matrix, aggregates and fibers, etc.), and chemical bonds that interact through local chemical reactions, intermolecular forces, and interphase diffusion. Processes occurring at the nanoscale, including origination and development of amorphous and crystalline phases and of interphase boundaries, ultimately affect the engineering properties and performance of the bulk material. Nano-modification or nano-engineering of the rapid repair material encompasses the techniques of manipulation of the material structure at the nanometer scale. It is believed that alkali-activated cement, or geopolymer, based repair material can be nano-engineered by the incorporation of nano-sized building blocks or objects, such as nanoparticles, to enhance its overall performance including workability, strength development and chemical stability and durability.

SUMMARY

The present application provides a nano-modified dry-mixed alkali-activated cementitious material for rapid repair, including an aluminosilicate rich material, an alkali material and a nano-modifier, wherein the material attains a 1-day compressive strength of no less than about 14 MPa.

In another embodiment, in conjunction with any of the above and below embodiments, the aluminosilicate rich material may include at least one member selected from pozzolans, latent hydraulic binder components, blast furnace slag and ground granulated blast furnace slag, slag, steel slag and phosphorus slag, ash from municipal solid waste incinerator, fly ash, metakaolin, nepheline and feldspar.

In another embodiment, in conjunction with any of the above and below embodiments, the aluminosilicate rich material may include ground granulated blast furnace slag in an amount of about 20-100% w/w, more preferably about 50-100% w/w, of the total aluminosilicate rich material.

In another embodiment, in conjunction with any of the above and below embodiments, the ground granulated blast furnace may have an average grain size of less than about 50 microns, and more preferably around 25 microns.

In another embodiment, in conjunction with any of the above and below embodiments, the aluminosilicate rich material may include fly ash in an amount of about 0-80% w/w, more preferably 0-50% w/w, of the total aluminosilicate rich material.

In another embodiment, in conjunction with any of the above and below embodiments, the fly ash may have an average grain size of less than about 50 microns, and more preferably around 25 microns.

In another embodiment, in conjunction with any of the above and below embodiments, the aluminosilicate rich material may include metakaolin in an amount of about 0-25% w/w of the total aluminosilicate rich material.

In another embodiment, in conjunction with any of the above and below embodiments, the metakaolin may have an average grain size of less than about 50 microns, and more preferably less than around 25 microns.

In another embodiment, in conjunction with any of the above and below embodiments, the aluminosilicate rich material may include nepheline in an amount of about 0-25% w/w of the total aluminosilicate rich material.

In another embodiment, in conjunction with any of the above and below embodiments, the aluminosilicate rich material may include feldspar in an amount of about 0-25% w/w of the total aluminosilicate rich material.

In another embodiment, in conjunction with any of the above and below embodiments, the alkali material may include at least one member selected from potassium hydroxide and sodium hydroxide.

In another embodiment, in conjunction with any of the above and below embodiments, the alkali material may be present in an amount of about 0-15% w/w, more preferably about 0-10% w/w, of the total aluminosilicate rich material.

In another embodiment, in conjunction with any of the above and below embodiments, the cementitious material may further include sodium silicate and/or potassium silicate in a total amount of about 0-20% w/w, more preferably about 0-15% w/w, of the total aluminosilicate rich material.

In another embodiment, in conjunction with any of the above and below embodiments, the nano-modifier may include at least one nanoparticle selected from nano-silica, nano-alumina, nano-clay and silica fume.

In another embodiment, in conjunction with any of the above and below embodiments, the nano-modifier may be present in an amount of about 0-5% w/w of the total weight of the cementitious material.

In another embodiment, in conjunction with any of the above and below embodiments, the nano-modifier may have a size of less than about 500 nm, and more preferably less than about 100 nm.

In another embodiment, in conjunction with any of the above and below embodiments, the cementitious material may further include at least one fibers selected from polyvinyl alcohol (PVA), polypropylene (PP) and polyethylene terephthalate (PET) fibers.

In another embodiment, in conjunction with any of the above and below embodiments, the fibers may have a length of less than about 12 mm and a diameter of less than about 50 microns.

In another embodiment, in conjunction with any of the above and below embodiments, the cementitious material may be freshly mixed with water before application.

In another embodiment, in conjunction with any of the above and below embodiments, the cementitious material may be further mixed with aggregates and water to form mortar and concrete.

BRIEF DESCRIPTIONS OF THE DRAWINGS

The embodiments of the present application are described with reference to the attached figures, wherein.

DETAILED DESCRIPTION

Figure 1:
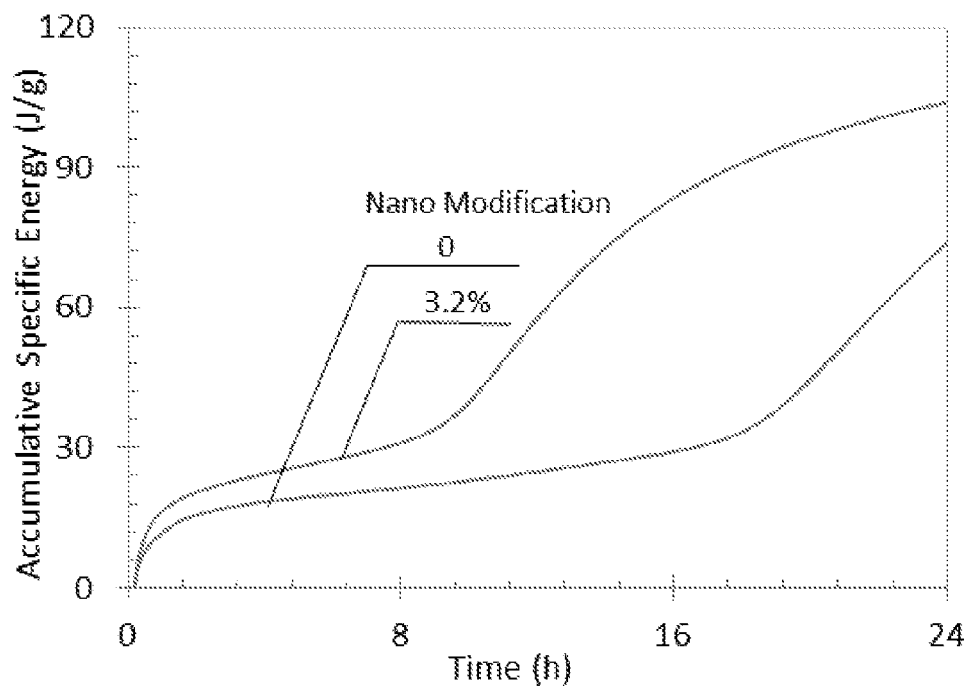
FIG. 1 shows the accumulative specific energy of the OPgCs in Examples 1 and 2 within 24 h after mixing.

Reference will now be made in detail to preferred embodiments of nano-modified dry-mixed alkali-activated cementitious materials, examples of which are also provided in the following description. Exemplary embodiments of the cementitious materials disclosed in the present application are described in detail, although it will be apparent to those skilled in the relevant art that some features that are not particularly important to an understanding of the present application may not be shown for the sake of clarity.

Before the present application is described in further detail, it is to be understood that the terminology used herein is for the purpose of describing particular embodiments only, and is not intended to be limiting, since the scope of the present application will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the application. The upper and lower limits of these smaller ranges may independently be included in the smaller ranges is also encompassed within the application, subject to any specifically excluded limit in the stated range. Where the stated range includes one or both of the limits, ranges excluding either or both of those included limits are also included in the application.

Unless defined otherwise, all technical and scientific terms used herein have the same meaning as commonly understood by one of ordinary skill in the art to which this application belongs. Although any methods and materials similar or equivalent to those described herein can also be used in the practice or testing of the present application, a limited number of the exemplary methods and materials are described herein.

It must be noted that as used herein and in the appended claims, the singular forms "a", "an", and "the" include plural referents unless the context clearly dictates otherwise.

The present application provides a nano-modified dry-mixed alkali-activated cementitious, or OPgC, material with high early strength for rapid repair of cement-based infrastructure components.

The dry-mixed alkali-activated cementitious material includes modulated alkali activator and adjusted aluminosilicate rich materials (ASRM) with modification of nano-particles. The modulated alkali activates the aluminosilicate rich materials to gain strength. The alkali activator may include a regulated and processed alkali in solid form, which facilitates storage and transportation of the material as well as reduces potential hazards which would be induced by alkali in liquid/solution form. The reactive aluminosilicate rich material may include classified recyclable materials, which further enhance the sustainability of the OPgC based rapid repair materials.

Nano-modification of the alkali-activated cement-based repairing material by incorporation of nano-sized building blocks or objects, such as nanoparticles, can enhance its overall performance, including workability, strength development, chemical stability and durability. The dry-mixed alkali-activated cementitious material of the present application can be an alternative binding matrix for the development of an environmentally friendly and cost effective rapid repair material.

Alkali-activated cementitious material is also known as geopolymer. Therefore, the major component of the present application can be abbreviated as OPgC (one-part geopolymer cement). The nano-modified OPgC can be used for rapid repair of cement-based infrastructure components due to its high early strength associated with an appropriate workability.

The nano-modified OPgC of the present application may include an aluminosilicate rich material, an alkali material and a nano-modifier. Optionally, the nano-modified OPgC may further include other functional admixtures such as alkali metal silicates, rheology modifiers, water reducers and plasticizers, etc. Fibers may be optionally added into the nano-modified OPgC to enhance toughness. Fine and coarse aggregate may also be included to form mortar and concrete rapid repair materials.

The aluminosilicate rich material may include at least one member selected from pozzolans, latent hydraulic binder components such as blast furnace slag and ground granulated blast furnace slag (GGBS), slag such as steel slag and phosphorus slag, ash from municipal solid waste incinerator, fly ash, metakaolin, nepheline and feldspar. To be more environmentally friendly, the aluminosilicate rich material preferably include at least one member selected from ground granulated blast furnace slag (GGBS), fly ash, metakaolin, nepheline and feldspar.

In an embodiment, in conjunction with any of the above and below embodiments, the aluminosilicate rich material may include GGBS in an amount of about 20-100% w/w, more preferably about 50-100% w/w, of the total aluminosilicate rich material. The average grain size of GGBS may be less than about 50 microns, and more preferably around 25 microns.

In another embodiment, in conjunction with any of the above and below embodiments, the aluminosilicate rich material may include fly ash in an amount of about 0-80% w/w, more preferably about 0-50% w/w, of the total aluminosilicate rich material. The average grain size of fly ash may be less than about 50 microns, and more preferably around 25 microns.

In another embodiment, in conjunction with any of the above and below embodiments, the aluminosilicate rich material may include metakaolin in an amount of about 0-25% w/w of the total aluminosilicate rich material. The average grain size of metakaolin may be less than about 50 microns, and more preferably less than about 25 microns.

In another embodiment, in conjunction with any of the above and below embodiments, the aluminosilicate rich material may include nepheline in an amount of about 0-25% w/w of the total aluminosilicate rich material.

In another embodiment, in conjunction with any of the above and below embodiments, the aluminosilicate rich material may include feldspar in an amount of about 0-25% w/w of the total aluminosilicate rich material.

In another embodiment, in conjunction with any of the above and below embodiments, the alkali material may include at least one member selected from hydroxides of potassium (K) and sodium (Na). The amount of alkali materials may be in the range of about 0-15% w/w, more preferably about 0-10% w/w, of the total aluminosilicate rich material.

In another embodiment, in conjunction with any of the above and below embodiments, the nano-modified OPgC of the present application may further include sodium silicate and/or potassium silicate in a total amount of about 0-20% w/w, more preferably about 0-15% w/w, of the total aluminosilicate rich material.

In another embodiment, in conjunction with any of the above and below embodiments, the nano-modifier for enhancing strength development in the OPgC may include at least one nanoparticle selected from nano-silica, nano-alumina, nano-clay and silica fume. The nano-modifier may be present in an amount of about 0-5% w/w of the total weight of nano-modified OPgC. The nano-modifiers may have a size of less than about 500 nm, and more preferably less than about 100 nm.

While not wishing to be bound by theory, it is believed that the fibers in the nano-modified OPgC contribute to the improvement of the flexure strength. Suitable fibers may include at least one member selected from polyvinyl alcohol (PVA), polypropylene (PP) and polyethylene terephthalate (PET) fibers. The amount of fibers may be in the range of about 0-2% w/w of the total weight of nano-modified OPgC. Preferably, the fibers may have a length of less than about 12 mm and a diameter of less than about 50 microns.

According to the dry-mixed alkali-activated cementitious material of the present application, the aluminosilicate rich material, the alkali material, the nano-modifier, optionally the other functional admixtures and optionally the fibers in solid powder form may be mixed evenly in any sequence or simultaneously. These components may be mixed by a dry powder mixer to obtain a dry powder form ready-mix cementitious material.

To apply the ready-mix cementitious material for repairing and other related works, the cementitious material may be freshly mixed with water to obtain an alkali-activated cement, geopolymer, based repairing paste material. Preferably, the setting time of the paste is no less than about 15 min. The 1-day early compressive strength of the paste is no less than about 14 MPa, and preferably no less than about 21 MPa. The sprayability and excellent acid resistance of the paste render it suitable for use in repairing works.

With the addition of fine aggregate, the dry-mixed alkali-activated cementitious material of the present application may be prepared as a repairing mortar. The fine aggregate may be any aggregate having a mean particle size of <5 mm, such as micro quartz sand and perlite. The cementitious material may be mixed with the fine aggregate in an amount of about 0-150% w/w of the total weight of nano-modified OPgC, and mixed with water to obtain a type of alkali-activated cement, or geopolymer, based repair mortar.

With the addition of fine and coarse aggregate, the dry-mixed alkali-activated cementitious material of the present application may be prepared as a repairing concrete. The coarse aggregate may be any aggregate having a mean particle size of >5 mm. The cementitious material may be mixed with the coarse aggregate in an amount of about 0-200% w/w of the total weight of nano-modified OPgC, and mixed with water to obtain a type of alkali-activated cement, or geopolymer, based repair concrete.

EXAMPLES

Experimental tests of early strength (curing age of 1-day) and setting time were performed on the nano-modified OPgC samples prepared by the following procedures:

1. One or more aluminosilicate rich materials (ASRM) are dry mixed evenly using a dry-powder mixer.
2. The alkali activator materials in powder form are evenly mixed with the above aluminosilicate rich materials.
3. The nano-modifier is mixed with the mixture obtained from the previous step using a dry-powder mixer. A one-part geopolymer cement (OPgC) is obtained. The fibers, fine and coarse aggregates and other functional admixtures may be optionally mixed with the mixture in a similar manner
4. The OPgC in powder form is then added with water, where the geopolymerization reaction takes place to form strength. The OPgC binds with other aggregates or unreacted components in different forms of paste, mortar, and concrete.
5. For experimental testing, setting time of fresh OPgC paste is measured by Vicat needle in accordance with the standard test method presented in ASTM C191.
6. The OPgC paste is then casted in steel moulds with a dimension of 40×40×160 mm to form samples. The samples are cured at room temperature (23±2° C.) and air tight (by plastic wrap) condition then demoulded 24 h after mixing with water.

Example 1

As a starting example, an OPgC paste without nano-modifier was prepared with the following composition and moulded at the following condition according to the above procedure.

| Constituents of OPgC | Weight (g) |
| --- | --- |
| Slag | 93-98 |
| Fly ash | 3-5 |
| Metakaolin | 2-5 |
| Feldspar | 1-3 |
| Sodium hydroxide powder | 2.0 |
| Potassium hydroxide powder | 0.2 |
| Sodium silicate powder | 5.4 |
| Nano-silica | 0 |
| Silica fume | 0 |
| Mixing proportion | 5 kg OPgC to 1.6 kg water |
| Setting time at 23 ± 2° C. | 220 min |
| Curing condition | Air tight at 23 ± 2° C. |
| Measured early strength (after 24 h) | 17.6 MPa |

Geopolymer cement is commonly recognized as alternative cement more environmentally friendly compared to Ordinary Portland Cement. However, the liquid alkali in conventional two-parts geopolymer cement is associated with potential hazard in construction works and increases the cost of storage and transportation and limits its applications. One-part geopolymer cement will all constituents in dry powder form, can be used on-site by directly adding water. The easy storage, transportation and the reduced labor cost are the major advantages of using one-part geopolymer cement.

The workability and mechanical properties of one-part geopolymer cement (OPgC) based cementitious materials can be adjusted by controlling on the components of activators. This example gives a successful case of OPgC, all the constituents are in dry powder form. By directly adding water, the OPgC based material achieved an early strength >15 MPa under room temperature curing conditions. The strength is acceptable for rapid repairing works but the setting time should be shortened.

Example 2

A nano-modified OPgC paste was prepared with the following composition and moulded at the following condition according to the above procedure.

| Constituents of OPgC | Weight (g) |
| --- | --- |
| Slag | 93-98 |
| Fly ash | 3-5 |
| Metakaolin | 2-5 |
| Feldspar | 1-3 |
| Sodium hydroxide powder | 2.0 |
| Potassium hydroxide powder | 0.2 |
| Sodium silicate powder | 5.4 |
| Nano-silica | 3.2 |
| Silica fume | 0 |
| Mixing proportion | 5 kg OPgC to 1.6 kg water |
| Setting time at 23 ± 2° C. | 80 min |
| Curing condition | Air tight at 23 ± 2° C. |
| Measured early strength (after 24 h) | 33.8 MPa |

This example gives a case of OPgC based repairing material where nanoparticles were added to modify the workability. Compared with Example 1, with the incorporation of nano-silica, the setting time has been shortened from over 200 minutes to only 80 minutes, which is favorable for rapid repairing works. Furthermore, the 24 h early compressive strength was increased from 17.6 MPa to 33.8 MPa. A remarkable 90% enhancement on strength was achieved via nanoparticles incorporation.

It is believed that nanoparticles act as additional nucleation sites for the formation of reaction products and accelerate the geopolymerization process of the alkali activated cementitious system, which in turn enhances early strength development facilitating rapid repair works.

To reveal the effect of nano-modification on early strength development, the correlation between geopolymerization heat release and compressive strength within 24 h after mixing with water have been investigated. An isothermal calorimeter was employed to measure the specific heat energy (J/g) released from the OPgCs of Example 1 (without nano-modification) and Example 2 (with nano-modification). FIG. 1 illustrates the accumulative specific energy generated from one unit (one gram) of OPgC detected by the calorimeter. With nano-modification, the accumulative hydration heat of the OPgC systems was increased drastically. It can be seen that when 3.2% nano-silica (w/w of ASRM) was added into the mixture, higher accumulative specific energy OPgC was detected, which indicates more intense geopolymerization process was taken place within the given reaction time. Consequently, higher compressive strength is expected and indeed measured and compared above. The increased heat of geopolymerization is attributed to the additional nucleation sites in the binding system provided by the nanoparticles. Quantitative comparison has been made between the geopolymerization heat release and the measured compressive strength. After 24 h reaction, the accumulative specific energy of 103.98 J and 73.81 J per unit OPgC has been detected for the mixture with and without nano-silica addition, respectively. In other words, 40% more geopolymerization heat was released due to 3.2% nano-silica addition.

The 24 hours compressive strength test results showed that 33.8 MPa and 17.6 MPa strength has been achieved for mixture with and without nano-silica addition, respectively. The strength enhancement is over 90% compared to the mixture without nano-silica incorporation. The heat release of geopolymerization was tested and recorded under an isothermal condition, and such constant ambient temperature has a suspension effect on the continued geopolymerization reaction. To the contrary, the casted samples for compressive strength test were cured under air tight conditions at room temperature. At the initial stage, the geopolymerization reaction causes temperature rising within the samples, thereby speeding up the reaction. Hence, 90% strength enhancement is reasonably corresponds to 40% increment in geopolymerization heat release.

Example 3

An OPgC paste was prepared with the following composition and moulded at the following condition according to the above procedure.

| Constituents of OPgC | Weight (g) |
|---|---|
| Slag | 92-95 |
| Fly ash | 4-7 |
| Metakaolin | 1-3 |
| Feldspar | 1-2 |
| Sodium hydroxide powder | 1.7 |
| Potassium hydroxide powder | 0.4 |
| Sodium silicate powder | 12.9 |
| Nano-silica | 0 |
| Silica fume | 0 |
| Mixing proportion | 5 kg OPgC to 1.6 kg water |
| Setting time at 23 ± 2° C. | 18 min |
| Curing condition | Air tight at 23 ± 2° C. |
| Measured early strength (after 24 h) | 26.2 MPa |

This example gives another successful case of OPgC. Activator control plays an important role in OPgC. Different composition of ASRM would adjust the reactivity of the reactive powder, while the modulation of alkali activator would adjust the workability and reaction chemistry of the geopolymerization process.

Compared with Example 1, the sodium silicate powder amount was increased while the alkali metal hydroxide was maintained at the same level. The different formulation resulted in enhanced early strength and significantly promoted setting.

From the Example 1 and Example 3, it can be seen that it is feasible to achieve diversified workability and different mechanical properties with different formulation associated with varied composition of ASRM and modulation of alkali activator.

Example 4

A nano-modified OPgC paste was prepared with the following composition and moulded at the following condition according to the above procedure.

| Constituents of OPgC | Weight (g) |
|---|---|
| Slag | 92-95 |
| Fly ash | 4-7 |
| Metakaolin | 1-3 |
| Feldspar | 1-2 |
| Sodium hydroxide powder | 1.7 |
| Potassium hydroxide powder | 0.4 |
| Sodium silicate powder | 12.9 |
| Nano-silica | 1.2g |
| Silica fume | 0 |
| Mixing proportion | 5 kg OPgC to 1.6 kg water |
| Setting time at 23 ± 2° C. | 15 min |
| Curing condition | Air tight at 23 ± 2° C. |
| Measured early strength (after 24 h) | 35.8 MPa |

This example gives another successful case of applying nano-modification on OPgC systems. Compared with Example 3, it can be seen that for 100 unit ASRM, the addition of 1.2 unit nano-silica led to over 30% strength enhancement and slightly quicker setting. It indicates that for OPgC prepared from diversified ASRM components and activators, the nano-silica used in this application acts as a modifier for strength enhancement and for workability adjustment.

Example 5

A nano-modified OPgC paste with higher level of nano modification was prepared with the following composition and moulded at the following condition according to the above procedure.

| Constituents of OPgC | Weight (g) |
|---|---|
| Slag | 92-95 |
| Fly ash | 4-7 |
| Metakaolin | 1-3 |
| Feldspar | 1-2 |
| Sodium hydroxide powder | 1.7 |
| Potassium hydroxide powder | 0.4 |
| Sodium silicate powder | 12.9 |
| Nano-silica | 3.5g |
| Silica fume | 0 |
| Mixing proportion | 5 kg OPgC to 1.6 kg water |
| Setting time at 23 ± 2° C. | 8 min |
| Curing condition | Air tight at 23 ± 2° C. |
| Measured early strength (after 24 h) | 47.4 MPa |

Based on the nano-silica free case given in Example 3, 3.5 unit of nano-silica was employed in this example as a modifier.

Compared with Example 4, increased amount of nano-silica in Example 5 further enhanced the strength of OPgC paste. Meanwhile, at constant water usage, the setting time in Example 5 is shorter than that in Example 4. The results obtained in Examples 4 and Example 5 demonstrate that the workability and strength of the OPgC based repairing material can be adjusted in varied levels via controlling the amount of nano-modifier.

Figure 2:
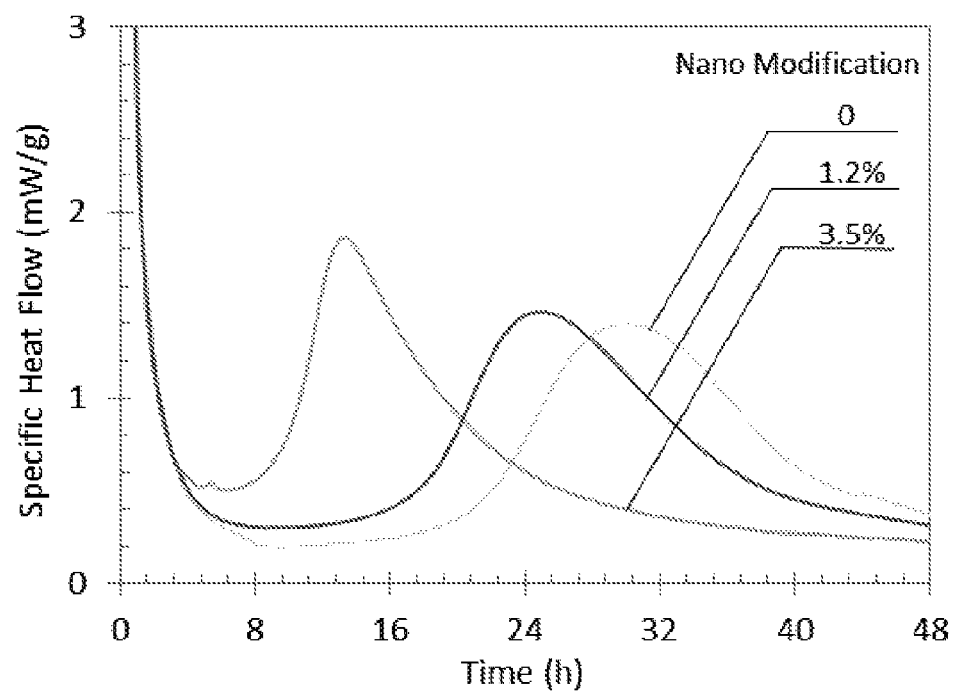
FIG. 2 shows the specific heat flow of the OPgCs in Examples 3-5 with different levels of nano-modification.

A high precision calorimeter (CalmetriX I-Cal 8000 HPC) was employed to measure the specific heat flow (mW) of OPgC in Examples 3-5. At known mass, the heat flow induced by geopolymerization can be auto-calculated in mW per gram of OPgC. The specific heat flow released from OPgC's reaction is related to the setting time of OPgC based repairing materials. The effect of nanoparticles on the specific heat flow of the OPgCs is illustrated in FIG. 2. It can be seen that the peak of heat flow of Example 3 (no nano-modification) occurred after 30 hours of geopolymerization reaction. When nanoparticles were introduced to the cement, the curves are totally different: with 1.2% nano-silica addition (Example 4), the peak of heat flow occurred after 24 hours of geopolymerization reaction and with 3.5% nano-silica addition (Example 5), the peak of heat flow occurred within 14 hours. Earlier occurrence of the specific heat flow peak indicates promoted geopolymerization at the early stage. Consequently, the detected setting time of OPgC mixture with 3.5%, 1.2% and 0% nano-silica was 8 min, 15 min and 18 min, respectively.

Example 6

An OPgC paste was prepared with the following composition and moulded at the following condition according to the above procedure.

| Constituents of OPgC | Weight (g) |
| --- | --- |
| Slag | 47-50 |
| Fly ash | 43-48 |
| Metakaolin | 3-5 |
| Feldspar | 5-7 |
| Sodium hydroxide powder | 6.5 |
| Potassium hydroxide powder | 1.1 |
| Sodium silicate powder | 12.4 |
| Nano-silica | 0 |
| Silica fume | 0 |
| Mixing proportion | 5 kg OPgC to 1.75 kg water |
| Setting time at 23 ± 2° C. | 100 min |
| Curing condition | Air tight at 23 ± 2° C. |
| Measured early strength (after 24 h) | 18.7 MPa |

This example gives a successful case of preparation OPgC with higher proportion of fly ash incorporation as ASRM.

The use of fly ash enhances the sustainability of the OPgC developed in this patent application for the following reasons:

Compared to slag, fly ash is more cost effective;

Compared to slag, fly ash is more environmentally friendly from the perspective of energy consumption in the production process;

Using of fly ash helps to postpone the setting of OPgC at given water usage, thus it is feasible to achieve desired setting time of OPgC paste developed in this patent application by adjusting the proportion of fly ash in ASRM.

Comparing Example 6 with Example 1, it can be seen that it is feasible to achieve diversified workability while maintaining the comparable early strength by formulation adjustment on the ASRM proportion, the activators and the water usage.

This example demonstrates the fact that it is feasible to employ ASRM components with higher sustainability for fabricating the OPgC based rapid repairing material.

Example 7

A nano-modified OPgC paste was prepared with the following composition and moulded at the following condition according to the above procedure.

| Constituents of OPgC | Weight (g) |
| --- | --- |
| Slag | 47-50 |
| Fly ash | 43-48 |
| Metakaolin | 3-5 |
| Feldspar | 5-7 |
| Sodium hydroxide powder | 6.5 |
| Potassium hydroxide powder | 1.1 |
| Sodium silicate powder | 12.4 |
| Nano-silica | 2.4 |
| Silica fume | 0 |
| Mixing proportion | 5 kg OPgC to 1.75 kg water |
| Setting time at 23 ± 2° C. | 50 min |
| Curing condition | Air tight at 23 ± 2° C. |
| Measured early strength (after 24 h) | 21.4 MPa |

This example gives one more successful case of nano modification.

Compared with Example 6, at constant water usage, with the incorporation of 2.4 unit nano-silica, the setting time of the OPgC based paste was shortened from 100 minutes to 50 minutes, which is favorable for rapid repairing works. Furthermore, the nano-modification results in about 14% early strength enhancement.

It is commonly acknowledged that compared to slag, the use of fly ash in OPgC systems results in strength loss. This example demonstrates that the strength loss caused from fly ash incorporation can be mitigated by applying nano-modification technology. Thus, applying nano-modification technology developed in this patent application enables higher proportions of supplementary ASRM incorporation without causing unacceptable strength loss.

Example 8

A nano-modified OPgC paste was prepared with the following composition and moulded at the following condition according to the above procedure.

| Constituents of OPgC | Weight (g) |
| --- | --- |
| Slag | 47-50 |
| Fly ash | 43-48 |
| Metakaolin | 3-5 |
| Feldspar | 5-7 |
| Sodium hydroxide powder | 6.5 |
| Potassium hydroxide powder | 1.1 |
| Sodium silicate powder | 12.4 |
| Nano-silica | 3.6 |
| Silica fume | 0 |
| Mixing proportion | 5 kg OPgC to 1.75 kg water |
| Setting time at 23 ± 2° C. | 28 min |
| Curing condition | Air tight at 23 ± 2° C. |
| Measured early strength (after 24 h) | 27.2 MPa |

Based on the mix proportion given by Example 6, 3.6 unit nano-silica was added in this example.

Comparing with Examples 7, the increased amount of nano-silica in Example 8 results in further reduced setting time and further enhanced early strength. In Example 7, the addition of 2.4 unit nano silica led to 14% strength increment, while in Example 8, with the addition of 3.6 unit nano silica, about 45% strength enhancement was achieved. On the other hand, when 2.4 unit nano silica was used, comparing with the nano-modifier-free mixture given by Example 6, the setting time of the OPgC paste was reduced from 100 minutes to 50 minutes, while the nano silica increased to 3.6 unit, the setting time was further shortened to less than 30 minutes. Generally the use of fly ash in OPgC system results in postponed setting. However, shorter setting is favorable for in rapid repairing applications. Hence, for OPgC prepared with high proportions of fly ash, the nano modification can be employed not only to mitigate the strength loss, but also to promote the setting of the OPgC paste.

The performance of the OPgC paste obtained in this example indicates the feasibility to achieve desired workability and early strength via the adjustment of nanoparticle amount when diversified ASRM employed in the OPgC system.

Example 9

An OPgC paste was prepared with the following composition and moulded at the following condition according to the above procedure.

| Constituents of OPgC | Weight (g) |
| --- | --- |
| Slag | 75-78 |
| Fly ash | 16-20 |
| Metakaolin | 2-5 |
| Feldspar | 4-7 |
| Sodium hydroxide powder | 5.1 |
| Potassium hydroxide powder | 0.6 |
| Sodium silicate powder | 14.3 |
| Nano-silica | 0 |
| Silica fume | 0 |
| Mixing proportion | 5 kg OPgC to 2.0 kg water |
| Setting time at 23 ± 2° C. | 110 min |
| Curing condition | Air tight at 23 ± 2° C. |
| Measured early strength (after 24 h) | 17.5 MPa |

This example gives one more successful case of OPgC paste prepared with ASRM containing 16% to 20% fly ash and a water/OPgC ratio of 0.4. The total alkali metal hydroxide content in this example is 5.7 unit.

Comparing the mix proportion of Example 9 with the mix proportion of Example 1 and Example 6, it can be seen that the total alkali metal hydroxide content increased from 2.1-2.2 unit to 5.7 unit, meanwhile the fly ash content in these three examples varies from less than 5% to 50% of total ASRM, and the water/OPgC ratio also varies from 0.32 to 0.40.

Generally with increased alkali metal hydroxide results in quicker setting and higher early strength, while increased water/OPgC ratio leads to slower setting and decreased early strength.

Comparing the performance of OPgC based paste prepared in Example 1, Example 6 and Example 9, the results demonstrate that by adjusting the water usage and the proportion of alkali metal hydroxide in the system, it is feasible to prepare OPgC based paste with comparable workability and comparable early strength with diversified ASRM constituents, diversified activators components and different water/OPgC ratio.

The three successful cases of OPgC paste prepared in Example 1, Example 6 and Example 9 demonstrates the high feasibility of formulation adjustment in the OPgC system developed in this patent.

Example 10

A nano-modified OPgC paste was prepared with the following composition and moulded at the following condition according to the above procedure.

| Constituents of OPgC | Weight (g) |
| --- | --- |
| Slag | 75-78 |
| Fly ash | 16-20 |
| Metakaolin | 2-5 |
| Feldspar | 4-7 |
| Sodium hydroxide powder | 5.1 |
| Potassium hydroxide powder | 0.6 |
| Sodium silicate powder | 14.3 |
| Nano silica | 0 |
| Silica fume | 3.0 |
| Mixing proportion | 5 kg OPgC to 2.0 kg water |
| Setting time at 23 ± 2° C. | 105 min |
| Curing condition | Air tight at 23 ± 2° C. |
| Measured early strength (after 24 h) | 25.1 MPa |

This example gives a case of OPgC paste prepared with 3 unit silica fume incorporation.

Silica fume, also known as micro silica, is an amorphous (non-crystalline) polymorph of silicon dioxide. It is an ultrafine powder collected as a by-product of the silicon and ferrosilicon alloy production. The particle size of the silica fume is smaller than the Ordinary Portland Cement. Silica fume can be used as a filler in conventional cementitious materials to enhance the impermeability thus to improve the durability properties. Proper amount of silica fume can also be employed for mechanical properties enhancement in paste, mortar and concrete.

Comparing with Example 9, it can be seen that with 3.0 unit silica fume addition, the setting time of OPgC paste was maintained at the same level meanwhile about 40% strength enhancement was achieved. It indicates that other than nano silica, the silica fume can also be employed as a modifier for strength enhancement in OPgC systems. However, unlike the nano silica used in this patent, the silica fume did not show obvious effect on the OPgC paste workability modification.

Example 11

A nano-modified OPgC paste was prepared with the following composition and moulded at the following condition according to the above procedure.

| Constituents of OPgC | Weight (g) |
| --- | --- |
| Slag | 75-78 |
| Fly ash | 16-20 |
| Metakaolin | 2-5 |
| Feldspar | 4-7 |
| Sodium hydroxide powder | 5.1 |
| Potassium hydroxide powder | 0.6 |
| Sodium silicate powder | 14.3 |
| Nano silica | 6.0 |
| Silica fume | 0 |
| Mixing proportion | 5 kg OPgC to 2.0 kg water |
| Setting time at 23 ± 2° C. | 25 min |
| Curing condition | Air tight at 23 ± 2° C. |
| Measured early strength (after 24 h) | 31.7 MPa |

This example gives one more successful case of applying nano modification on the OPgC paste.

Comparing with Example 9, the addition of 6 unit nano particles resulted in quicker setting and higher strength. The setting time was reduced drastically from 110 minutes to 25 minutes. Meanwhile Over 80% strength increment occurred. The shortened setting time and enhanced early strength are favourable for rapid repairing works.

Example 10 and example 11 illustrate the fact that both silica fume and nano silica can be used as modifiers in OPgC systems. However, the silica fume used in this patent application has a larger particle size than the nano silica, and consequently as OPgC modifiers, the effects are different.

Both Example 1 and Example 9 give a case of OPgC paste with around 18 MPa early strength. Based on the OPgC given by Example 1, with 3.2 unit nano silica incorporation, the early strength was enhanced to 33.8 MPa, or, over 90% strength increment was induced by the incorporation of nano silica. Based on the OPgC given by Example 9, with 3.0 unit silica fume incorporation, the early strength was improved to 25.1 MPa, or, only about 40% strength increment was achieved with comparable amount of modifier. Besides, the nano silica showed obvious effect on setting time promoting, meanwhile as illustrated by Example 10, with 3.0 unit silica fume, the setting time of OPgC paste was maintained at the same level compared to the silica free mix given by Example 9.

Based on the performance of nano silica modified and silica fume modified OPgC paste, the conclusion can be drawn: the nano silica used in this patent application possesses higher potential to be used as a modifier in one-part geopolymer cement for rapid repairing applications.

What is claimed is:

1. A nano-modified dry-mixed alkali-activated cementitious material for rapid repair, comprising an aluminosilicate material, an alkali material and a nanoparticle material, wherein the aluminosilicate material comprises at least feldspar in an amount of 1-25% w/w of the total aluminosilicate material and nepheline in an amount of 1-25% w/w of the total aluminosilicate material, and wherein the alkali material is present in an amount of 1-15% w/w of the total aluminosilicate material, and wherein the cementitious material attains a 1-day compressive strength of no less than 14 MPa.

2. The cementitious material of claim 1, wherein the aluminosilicate material further comprises one or more components selected from pozzolans, blast furnace slag and ground granulated blast furnace slag, slag, steel slag and phosphorus slag, ash from municipal solid waste incinerator, fly ash, and metakaolin.

3. The cementitious material of claim 2, wherein the aluminosilicate material comprises ground granulated blast furnace slag in an amount of at least 20% w/w of the total aluminosilicate material.

4. The cementitious material of claim 3, wherein the ground granulated blast furnace has an average grain size of less than 50 microns.

5. The cementitious material of claim 2, wherein the aluminosilicate material comprises fly ash in an amount of 0-80% w/w of the total aluminosilicate material.

6. The cementitious material of claim 5, wherein the fly ash has an average grain size of less than 50 microns.

7. The cementitious material of claim 2, wherein the aluminosilicate material comprises metakaolin in an amount of 0-25% w/w of the total aluminosilicate material.

8. The cementitious material of claim 7, wherein the metakaolin has an average grain size of less than 50 microns.

9. The cementitious material of claim 1, wherein the alkali material comprises at least one member selected from potassium hydroxide and sodium hydroxide.

10. The cementitious material of claim 1, wherein the alkali material is at least one member selected from the group consisting of potassium hydroxide and sodium hydroxide, and the cementitious material further comprises sodium silicate and/or potassium silicate in a total amount of 0-20% w/w of the total aluminosilicate material.

11. The cementitious material of claim 1, wherein the nanoparticle material comprises at least one of nano-silica, nano-alumina, nano-clay and silica fume.

12. The cementitious material of claim 11, wherein the nanoparticle material is present in an amount of 1% to 5% w/w of the total weight of the cementitious material.

13. The cementitious material of claim 11, wherein the nanoparticle material has a size of less than 500 nm.

14. The cementitious material of claim 1 further comprises at least one fibers selected from polyvinyl alcohol (PVA), polypropylene (PP) and polyethylene terephthalate (PET) fibers.

15. The cementitious material of claim 14, wherein the fibers have a length of less than 12 mm and a diameter of less than 50 microns.

16. The cementitious material of claim 1, wherein the cementitious material is freshly mixed with water before application.

17. The cementitious material of claim 1, wherein the cementitious material is further mixed with aggregates and water to form mortar and concrete.

* * * * *